United States Patent [19]

Tanaka

[11] Patent Number: 4,536,771
[45] Date of Patent: Aug. 20, 1985

[54] HEATING CONTROL DEVICE FOR A THERMAL INK-TRANSFER TYPE PRINTING APPARATUS

[75] Inventor: Hideshi Tanaka, Yokohama, Japan

[73] Assignee: Victor Company of Japan, Ltd., Yokohama, Japan

[21] Appl. No.: 474,194

[22] Filed: Mar. 10, 1983

[30] Foreign Application Priority Data

Mar. 16, 1982 [JP] Japan .................. 57-41192

[51] Int. Cl.³ ............................................. G01D 15/10
[52] U.S. Cl. ................................ 346/76 PH; 219/216
[58] Field of Search .................. 346/76 PH, 76 R; 219/216; 358/296, 298; 400/120; 250/317.1, 318

[56] References Cited

U.S. PATENT DOCUMENTS 3,984,844 10/1976 Tanno et al. .................... 346/76 PH
4,409,597 10/1983 Nakamura et al. ............. 346/76 PH
4,425,568 1/1984 Morigachi et al. ............. 346/76 PH

FOREIGN PATENT DOCUMENTS 2410569 9/1975 Fed. Rep. of Germany.
2531092 1/1976 Fed. Rep. of Germany.
2174482 10/1977 Fed. Rep. of Germany.
2924178 1/1980 Fed. Rep. of Germany.
2114850 8/1983 United Kingdom.

Primary Examiner—E. A. Goldberg
Assistant Examiner—A. Evans
Attorney, Agent, or Firm—Lester Horwitz

[57] ABSTRACT

A heating control for a thermal printing head having a plurality of head elements for heating a transfer sheet adhered with a kind of ink which melts due to heat and transferring melted ink onto a recording sheet which makes contact with the transfer sheet to print images such as characters and figures, the control having a converting circuit for sampling an input analog signal indicating tone or density of an image to be printed on the recording sheet according to the number of the head elements, and converting the input analog signal into a digital signal, a memory for storing the output converted digital signal of the converting circuit and reading out the stored digital signal from addresses corresponding to each of the head elements, and a control circuit for obtaining signals of addresses which are not adjacent to each other from among the signals of the addresses corresponding to the head elements thus read out from the memory and applying current to the head elements corresponding to the addresses of the signals obtained to heat the respective head elements, and then obtaining signals of addresses which are not adjacent to each other from among the signals of the addresses corresponding to the head elements thus read out from the memory excluding the signals of addresses already obtained and applying current to the head elements corresponding to the addresses of the signals this time obtained to heat the respective head elements.

7 Claims, 6 Drawing Figures

HEATING CONTROL DEVICE FOR A THERMAL INK-TRANSFER TYPE PRINTING APPARATUS

BACKGROUND OF THE INVENTION

The present invention generally relates to heating control devices for thermal ink-transfer type printing apparatuses (hereinafter referred to as thermal printing apparatuses), and more particularly to a heating control device for a thermal printing apparatus, in which heating is controlled so that currents are not simultaneously applied to mutually adjacent heating resistors among heating resistors of a plurality of head elements constituting a single thermal printing head.

Among terminal printers or hard-copy apparatuses such as wire-dot type, shuttle type, and ink-jet type printers, thermal printing apparatuses are being developed as one of the more promising type. For example, this thermal printing apparatus employs an ink film which is a polyester film having a thickness of 5 to 6 $\mu$m coated with a kind of ink which melts due to heat on one surface thereof. The ink film is placed onto a recording sheet with the ink side making contact with the recording sheet, and a thermal printing head makes contact with a rear side of the ink film. When a current flows through the thermal printing head so as to generate heat at the printing head, the ink on the ink film melts at the position corresponding to the position of the printing head, and the melted ink is transferred onto the recording sheet. This thermal printing head comprises a plurality of head elements arranged in a row, and a current is successively applied to each of these head elements.

The density which determines the tone of the printed characters, figures, diagrams, and the like, is determined by the area of each dot formed on the recording sheet due to the transfer of the melted ink onto the recording sheet. And, this area of the melted ink dot is determined according to the heating temperature of each of the head elements. Generally, the heat value becomes larger as the magnitude of the currents applied to the head elements become larger, or as the duration with which the currents are applied to the head elements becomes longer. As a result, the area of the melted ink dot becomes larger to increase the printing density, and the tone reaches near a saturated density.

However, the distance between centers of adjacent heating resistors constituting each of the head elements is 125 $\mu$m, for example, and the spacial distance between adjacent heating resistors is 20 $\mu$m, for example, and the heating resistors are provided exceedingly close to each other. Hence, if an attempt is made to increase the area of the melted ink dot so as to increase the printing density, that is, if an attempt is made to increase the heating temperature of each of the heating resistors, the temperature rises at intermediate points between the adjacent heat resistors due to the heat exerted by the adjacent heating resistors. Accordingly, although the dots are to be formed for each of the heating resistors, the ink also melts at the intermediate points between adjacent heating resistors, and led to a phenomenon in which the dots become connected. In this case, the printed characters, figures, and the like became unclear, and there was a disadvantage in that the printing could not be carried out accurately by the dots. On the other hand, if the heating temperature is set to a low temperature so as not to introduce the above undesirable phenomenon, the area of each of the dots become exceedingly small, and the maximum saturated density becomes low.

SUMMARY OF THE INVENTION

Accordingly, it is a general object of the present invention to provide a novel and useful heating control device for a thermal printing apparatus, in which the above described disadvantages have been overcome.

Another and more specific object of the present invention is to provide a heating control device for a thermal printing apparatus, designed to apply currents to a group of every other heating resistors and then apply currents to another group of every other heating resistors, for example, so that currents are not simultaneously applied to heating resistors of adjacent head elements. According to the device of the present invention, the thermal printing can be carried out with an accurate density.

Other objects and further features of the present invention will be apparent from the following detailed description when read in conjunction with the accompanying drawings.

DETAILED DESCRIPTION

Figure 1:
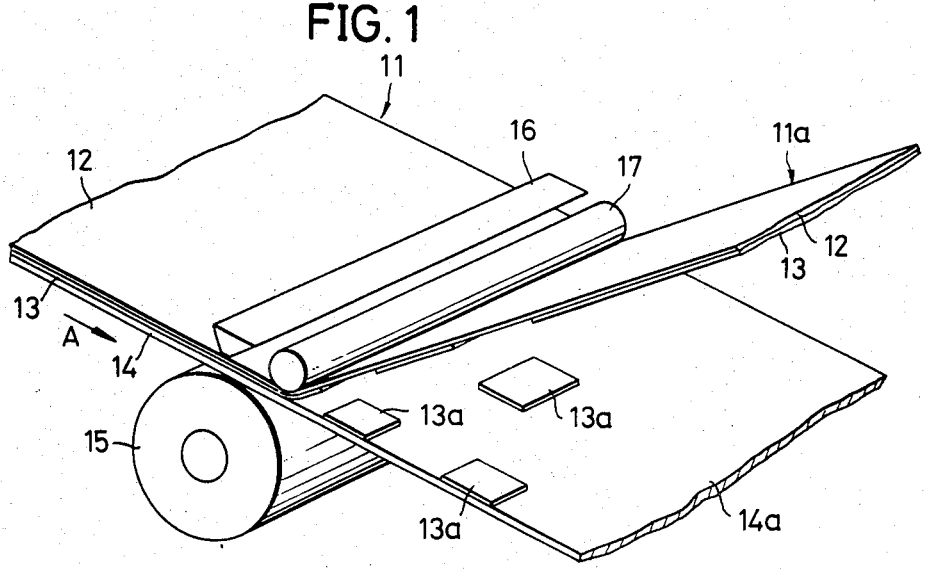
FIG. 1 is a general perspective view showing an example of an essential part of a thermal printing apparatus to which a heating control device according to the present invention may be applied.

FIG. 1 generally shows an example of an essential part of a thermal printing apparatus to which a heating control device according to the present invention may be applied. An ink film 11 acting as a transfer sheet, comprises a polyester film 12 and a ink 13 of a kind which melts due to heat coated over one surface of the polyester film 12 with a predetermined thickness. A recording sheet 14 makes contact with the side of the ink film 11 coated with the ink 13, and is fed along the direction of an arrow A by a roller 15 together with the ink film 11. A thermal printing head 16 is provided opposing the roller 15, and makes contact with the rear side of the ink film 11, that is, the side of the ink film 11 not coated with the ink 13.

The thermal printing head 16 extends along the width of the ink film 11, and for example, n (n is an integer) thin-film heating resistors each having a width of 105 $\mu$m are formed in parallel as head elements on a ceramic substrate. For example, the distance between centers of adjacent heating resistors is 125 $\mu$m. The number of head elements is determined by the number of dots on one line of the figure, character, picture, and the like to be printed. For example, if 1728 dots are to be printed on one line, 1728 head elements are provided.

Parts of the ink 13 on the ink film 11 corresponding to positions of the head elements which are applied with a current among the head elements constituting the thermal printing head 16, melt and are transferred onto the recording sheet 14. After the ink film 11 passes through the thermal printing head 16, the ink film 11 is guided by a roller 17, separated from the recording sheet 14 and then taken up by a take-up spool (not shown) as a used ink film 11a. The transferred ink 13a remains on a printed surface 14a of the printed recording sheet 14. The area of the transferred ink 13a is shown as a large area in FIG. 1 for conveniences' sake, however, the transferred ink 13a actually is a group of small dots.

Figure 2:
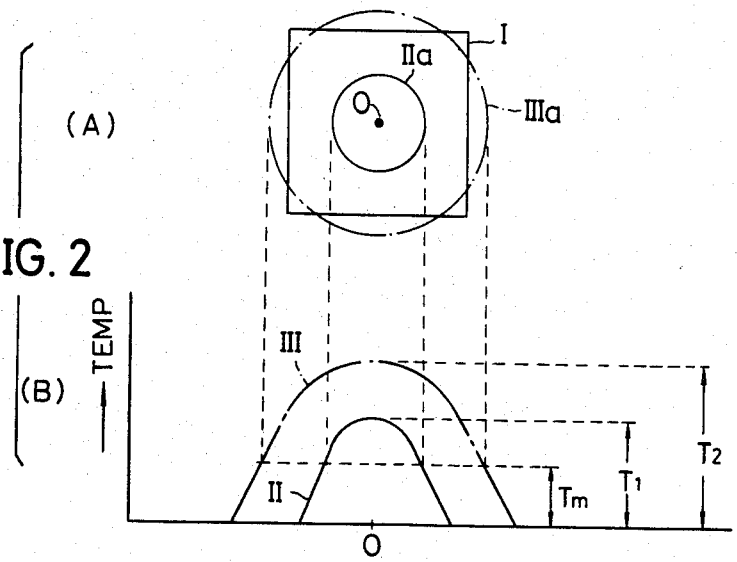
FIGS. 2(A) and 2(B) respectively are diagrams for explaining general melting of ink due to heat upon thermal transfer.

One dot is formed by one head element, and the size of that one dot is determined by the magnitude of the current applied to that one head element or the duration with which the current is applied to that one head element. Moreover, the density of the printed figures and the like, that is, the tone of printing is determined by the size of each of the dots. This is shown in FIGS. 2(A) and 2(B). The heating temperature distribution of the heating resistor of one head element becomes as indicated by curves II and III in FIG. 2(B) according to whether the quantity of current applied to the heating resistor is small or large, with respect to the position I of the heating resistor and its center position O shown in FIG. 2(A). When the quantity of applied current is small, the heating temperature distribution becomes a mountain shape having a maximum temperature T1 about the position O. On the other hand, when the quantity of applied current is large, the heating temperature distribution becomes a mountain shape having a maximum temperature T2 about the position O. If the melting limit temperature of the ink 13 is designated by a temperature Tm, the ink within a range of the heating temperature distribution equal to or over the temperature Tm melts in a range indicated between lines IIa and IIIa in FIG. 2(A).

Figure 3:
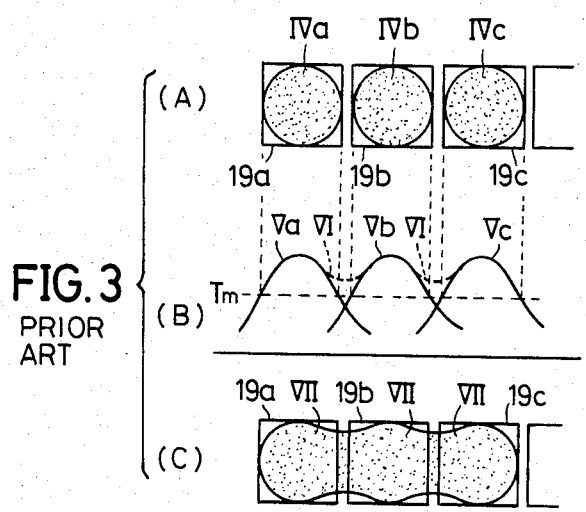
FIGS. 3(A) through 3(C) respectively are diagrams for explaining melting of ink according to a conventional device.

Conventionally, if heating resistors 19a, 19b, 19c, ... shown in FIG. 3(A) constituting each of the head elements were to form melted ink dots having a size indicated by lines IVa, IVb, IVc, ..., the heating temperature distributions obtained by the heating of the heating resistors 19a, 19b, 19c, ... became as indicated by curves Va, Vb, Vc, ... in FIG. 3(B). If there are no effects introduced between the heating resistors, the ink should melt at parts corresponding to a range equal to or over the melting critical temperature Tm with respect to each of the heating temperature distributions Va, Vb, Vc, ..., to form the dots IVa, IVb, IVc, ....

However, in reality, the heating temperature distributions of adjacent heating resistors 19a and 19b, 19b and 19c, ... effect each other. Hence, the heating temperature distribution between each of the heating resistors becomes as indicated by a dotted curve VI shown in FIG. 3(B), and as a result, a heating temperature distribution is formed in a range equal to or over the melting critical temperature Tm. Accordingly, although the dots having the size indicated by lines IVa, IVb, IVc, ... are to be formed originally, in actual practice, the ink dots become connected and an ink dot VII shown in FIG. 3(C) becomes formed. The present invention has overcome such an undesirable phenomenon, and detailed description thereof will now be given.

Figure 4:
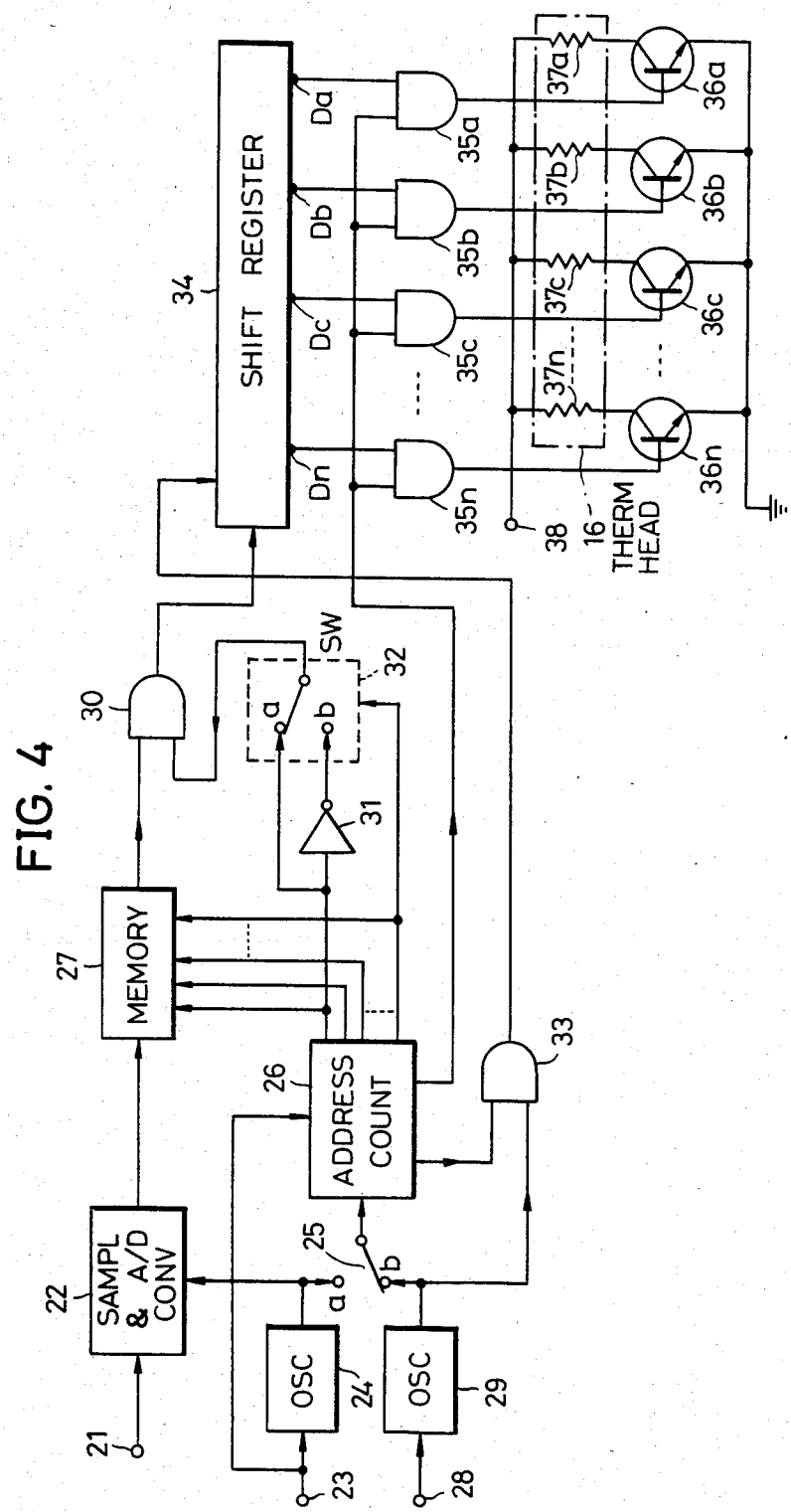
FIG. 4 is a system block diagram showing an embodiment of a heating control device for a thermal printing apparatus according to the present invention.

FIG. 4 shows a system block diagram of an embodiment of a heating control device according to the present invention. An analog signal of a picture and the like which is to be printed, is supplied to a sampling and analog-to-digital (A/D) converting circuit 22 through an input terminal 21. On the other hand, a synchronizing signal which is synchronized to one line (horizontal scanning line) of the above analog signal, is applied to an oscillator 24 through a terminal 23. The synchronizing signal applied to the oscillator 24 controls the oscilation operation of the oscillator 24, and is also supplied to an address counter 26 to reset the address counter 26. Output clock pulses of the oscillator 24 are supplied to the sampling and A/D converting circuit 22, and n (n is an integer equal to the number of head elements in the thermal printing head) samples of the analog signal supplied to the circuit 22 for each line. The circuit 22 converts the sampled signal into a digital signal indicating values "1" or "0", and supplies the digital signal to a memory 27.

The address counter 26 counts the clock pulses obtained from the oscillator 24 through a switch 25 which is connected to a contact a during a write-in mode, and produces an address signal designating addresses "1" through "n" for each line. The address signal produced from the address counter 26 is applied to the memory 27. Hence, the memory 27 writes in the digital signal into the addresses "1" through "n" for each line, and carries out this write-in operation for one picture frame, for example.

Upon starting of the printing, a start signal is applied to a terminal 28, and an oscillator 29 starts to oscillate. When starting the printing, the switch 25 is connected to a contact b, and an output clock signal of the oscillator 29 is supplied to the address counter 26. The output address signal of the address counter 26 is applied to the memory 27, to read out the signals stored at the addresses "1" through "n" of the memory 27 twice. The signals thus read out from the memory 27 are supplied to one input terminal of an AND-gate 30.

On the other hand, among the output address signals of the address counter 26, a first bit of an address signal indicating $2^0$ is directly applied to a contact a of a switching circuit 32 while the same address signal is applied to a contact b of the switching circuit 32 through an inverter 31 and inverted. The switching circuit 32 is applied with the (N+1)-th bit of an address signal indicating $2^N$, where N is a number satisfying $2^N = n$, and a moving contact of the switching circuit 32 is switched over between the contacts a and b. For example, the moving contact of the switching circuit 32 is connected to the contact a when the (N+1)-th bit is "0", and connected to the contact b when the (N+1)-th bit is "1".

Figure 5:
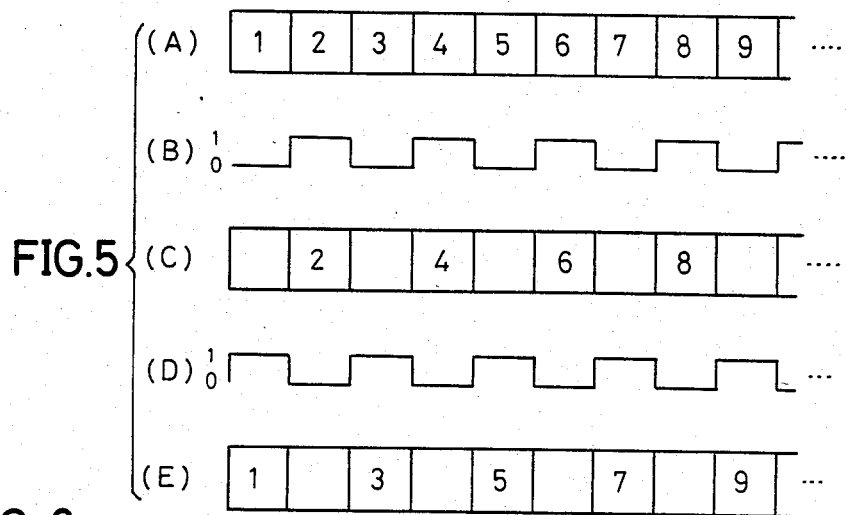
FIGS. 5(A) through 5(E) respectively are diagrams for explaining the operation of the block system shown in FIG. 4.

As shown in FIG. 5(A), the data at the addresses "1" through "n" are successively read out from the memory 27 with respect to a certain line. In FIGS. 5(A), 5(C), and 5(E), numbers within square boxes indicate the number of addresses comprising data. When reading out the first line from the memory 27, it is assumed that the signal of the (N+1)-th bit is "0" and the switching circuit 32 is connected to the contact a. As shown in FIG. 5(B), the signal of the first bit of the output address signal of the address counter 26 is a signal which alternately repeats the levels "1" and "0" for every other address. This signal shown in FIG. 5(B) is applied to the other input terminal of the AND-gate 30 through the switching circuit 32, as a gating signal. Accordingly, the output signal of the memory 27 shown in FIG. 5(A) is gated by the gating signal shown in FIG. 5(B) by the AND-gate 30. As a result, a signal of every other address shown in FIG. 5(C) which is gated by the level "1" of the gating signal, is obtained from the AND-gate 30 and supplied to a shift register 34.

The output clock signal of the oscillator 29 is supplied to an AND-gate 33, and is gated according to a signal also supplied to this AND-gate 33 from the address counter 26 for a duration similar to that of the read-out of one line. An output of the AND-gate 33 is applied to the shift register 34 as a clock pulse for data transfer. The shift register 34 stores the data signal obtained from the AND-gate 30. Outputs obtained through n output terminals $D_a$ through $D_n$ of the shift register 34, are supplied to one input terminal of respective AND-gates 35a through 35n.

Figure 6:
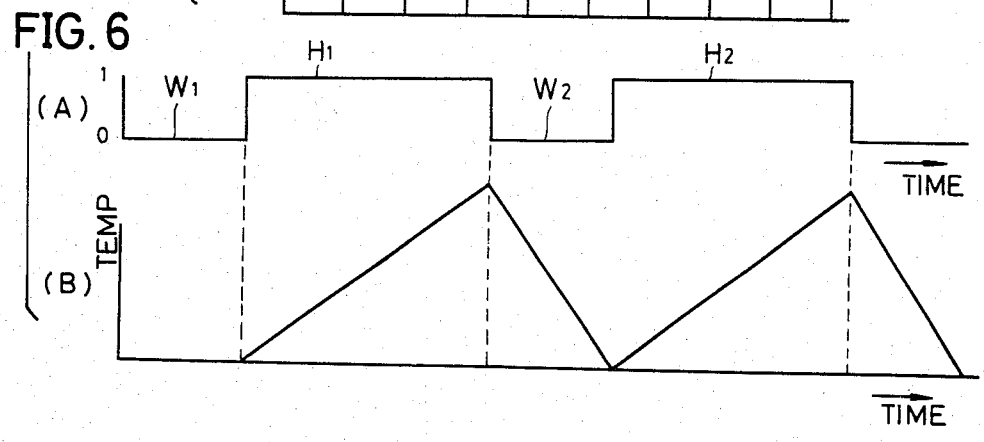
FIGS. 6(A) and 6(B) are graphs respectively showing a relation between heating pulses and heating temperature.

After the storing by the shift register 34, a heating pulse H1 shown in FIG. 6(A) is applied to the other input terminal of the respective AND-gates 35a through 35n from the address counter 26. Accordingly, the signals of every other addresses among the addresses "1" through "n" stored into the shift register 34 during a low-level period W1 before the heating pulse H1, pass through the AND-gates 35a through 35n during the interval in which the heating pulse H1 is applied to these AND-gates 35a through 35n, and are applied to respective bases of transistors 36a through 36n which are connected in parallel with emitters thereof respectively grounded. The transistors 36a through 36n are respectively turned ON when there are output signals from the respective terminals $D_a$ through $D_n$, and remain OFF when there are no output signals from the terminals $D_a$ through $D_n$.

Heating resistors 37a through 37n which are provided as head elements of the thermal printing head 16, are connected between a power source terminal 38 and collectors of the transistors 36a through 36n. Among the resistors 37a through 37n, those resistors which are connected to the transistors among the transistors 36a through 36n which turn ON, are applied with a current for the duration of the heating pulse H1 and generate heat as shown in FIG. 6(B).

When the first read-out is completed with respect to the above certain line, the signal of the (N+1)-th bit becomes equal to "1", and the switching circuit 32 becomes switched over and connected to the contact b. The read-out is again carried out by the memory 27 with respect to the above read-out line according to the signals from the address counter 26. The data of the addresses "1" through "n" this read out shown in FIG. 5(A), are supplied to the AND-gate 30. At this time, the signal shown in FIG. 5(D) which is obtained by inverting the signal shown in FIG. 5(B) at the inverter 31, is applied to the AND-gate 30 through the switching circuit 32 as a gating signal. Accordingly, the signals of every other addresses which were not gated previously, are obtained from the AND-gate 30 as shown in FIG. 5(E) and supplied to the shift register 34.

After the storing is completed in the shift register 34 during a period W2 shown in FIG. 6(A), a second heat pulse H2 is applied to the AND-gates 35a through 35n. Hence, for the duration of the heat pulse H2, the outputs at the terminals $D_a$ through $D_n$ of the shift register 34 are applied to the bases of the respective transistors 36a through 36n, to turn the transistors 36a through 36n ON or OFF according to these outputs at the terminals $D_a$ through $D_n$. Those resistors among the resistors 37a through 37n which are connected to the transistors among the transistors 36a through 36n which are turned ON, are respectively supplied with the current and generate heat for the duration of the heat pulse H2 as shown in FIG. 6(B). Similarly thereafter, the above described operations are repeatedly carried out with respect to each of the following lines, to carry out the printing of one picture.

In FIG. 4, a NAND-gate may be used instead of the AND-gate 30. In this case, the output of the NAND-gate is supplied to the shift register 34 through an inverter.

Hence, according to the device of the present invention, the heating of the heating resistors is controlled so that the heating resistors of a group of every other head elements are heated, and then, the heating resistors of another group of every other head elements are heated. That is, adjacent heating resistors are not heated simultaneously. Therefore, the undesirable phenomenon shown in FIG. 3(C) is prevented from occurring.

Further, the present invention is not limited to these embodiments, but various variations and modifications may be made without departing from the scope of the present invention.

What is claimed is:

1. A heating control device in a thermal ink-transfer type printing apparatus comprising a thermal printing head having n head elements with respect to one printing line, where n is an integer, each of said n head elements comprising a heating resistor for heating a transfer sheet having a kind of ink which melts due to heat and for transferring melted ink onto a recording sheet which makes contact with said transfer sheet to print images such as characters and figures, the heating resistors being physically isolated from each other, said heating control device comprising:

converting means for sampling an input analog signal indicating tone of printing of an image to be printed on said recording sheet in accordance with the number n of said head elements and for converting said input analog signal into a digital signal;

memory means for storing the output digital signal of said converting means and for reading out the stored digital signal from n addresses corresponding to each of said n head elements; and control means for obtaining during a first time period first signals read out from first n/2 addresses which are not adjacent to each other from among the signals read out from said n addresses in said memory means, for simultaneously driving during a second time period n/2 head elements corresponding to said first n/2 addresses so as to heat selected heating resistors from an initial temperature up to a predetermined temperature, for obtaining during a third time period second signals read out from remaining n/2 addresses which are not adjacent to each other from among the signals read out from said n addresses in said memory means, and for simultaneously driving during a fourth time period remaining n/2 head elements corresponding to said remaining n/2 addresses so as to heat selected heating resistors from the initial temperature up to the predetermined temperature, said first through fourth time periods being consecutive time periods, said second and fourth time periods being sufficiently long time periods so that heated heating resistors cool down approximately to the initial temperature from the predetermined temperature within said second and fourth time periods.

2. A heating control device as claimed in claim 1 in which said memory means reads out n data corresponding to the number n of said head elements twice for each printing line, and said control means obtains during said first time period signals of every other address among addresses "1" through "n" first read out from said memory means, and obtains during said third time period signals of different every other addresses among the addresses "1" through "n" next read out from said memory means.

3. A heating control device as claimed in claim 2 in which said control means comprises an address counter for producing an address signal for designating addresses in said memory means from which the stored signals are to be read out, a first bit of said address signal alternately repeating levels "1" and "0", inverting means for inverting the first bit of the output address signal of said address counter, switching means supplied with a last bit of the output address signal of said address counter for switching and obtaining the first bit of the output address signal of said address counter and an output signal of said inverting means, and means for obtaining signals of every other address from the signals read out from said memory means responsive to an output signal of said switching means.

4. A heating control device as claimed in claim 3 in which said means for obtaining signals of every other address comprises gating means having a pair of input terminals, and the signals read out from said memory means and supplied to one of said pair of input terminals are gated by the output signal of said switching means supplied to the other of said pair of input terminals.

5. A heating control device as claimed in claim 1 in which said memory means reads out n data corresponding to the number n of said heat elements twice for each printing line, and said control means comprises means for obtaining a control data by obtaining during said first time period signals of every other address among addresses "1" through "n" first read out from said memory means and for obtaining during said third time period signals of different every other addresses among the addresses "1" through "n" next read out from said memory means, an n-stage shift register for storing said control data, heating pulse generating means for generating heating pulses having predetermined intervals, n control elements connected to respective heating resistors of each of said head elements for controlling application of currents to said heating resistors, and applying means for applying outputs of said shift register to each of said control elements for a duration in which said heating pulses are applied thereto.

6. A heating control device as claimed in claim 5 in which said control elements respectively comprise transistors connected in series with respect to each of said heating resistors and mutually in parallel with respect to a power source, and said applying means comprises n AND-gates respectively applied with outputs of said shift register from each stage and commonly applied with said heating pulses.

7. A heating control device as claimed in claim 5 in which the pulse width of the heating pulses generated by said heating pulse generating means corresponds to the time width of each of said second and fourth time periods, and the interval of the heating pulses corresponds to the time width of each of said first and third time periods.

* * * * *